H. T. BURR.
COMBINED SNOW PLOW AND RUT CUTTER.
APPLICATION FILED MAY 22, 1909.
1,005,689.
Patented Oct. 10, 1911.
5 SHEETS—SHEET 2.
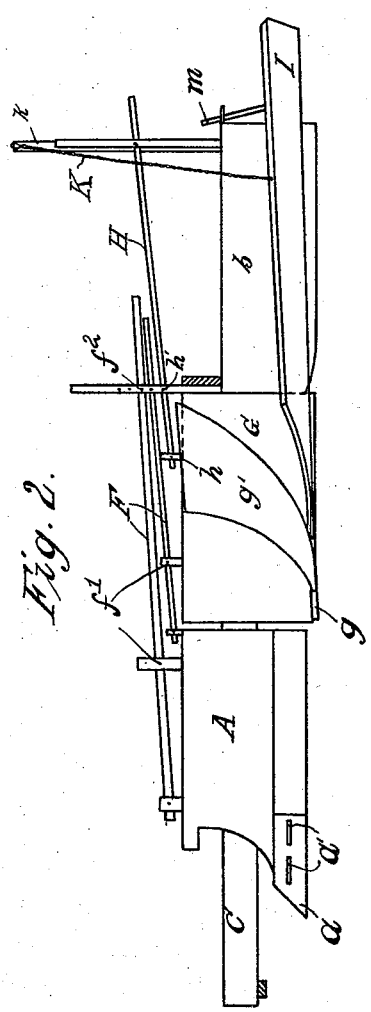
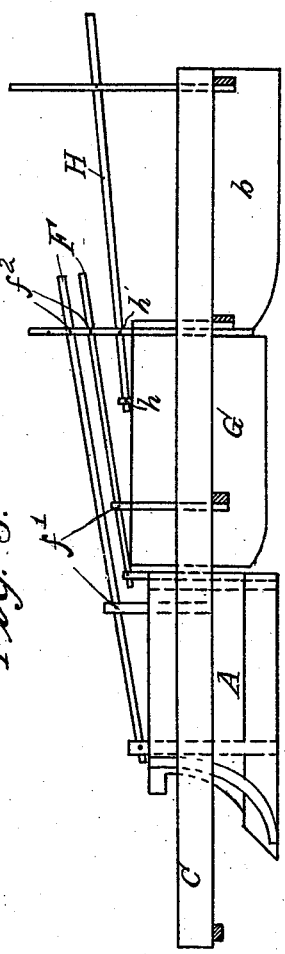
Inventor:
Harry T. Burr.

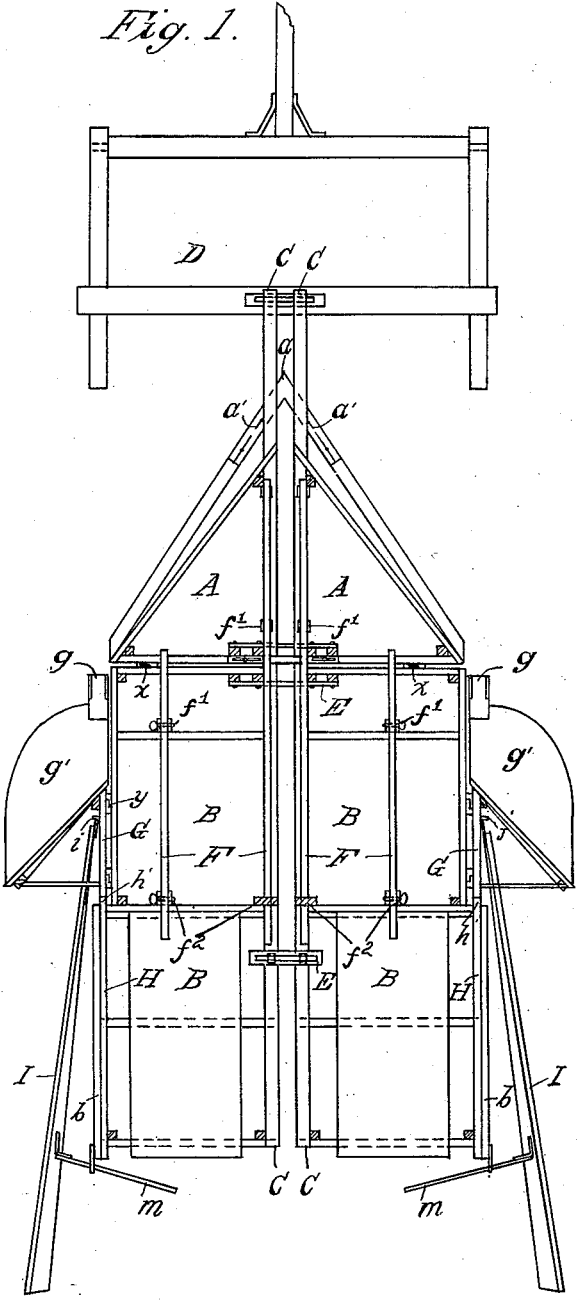

H. T. BURR.
COMBINED SNOW PLOW AND RUT CUTTER.
APPLICATION FILED MAY 22, 1909.

1,005,689.

Patented Oct. 10, 1911.
5 SHEETS—SHEET 3.

Witnesses.

Inventor.
Harry T. Burr

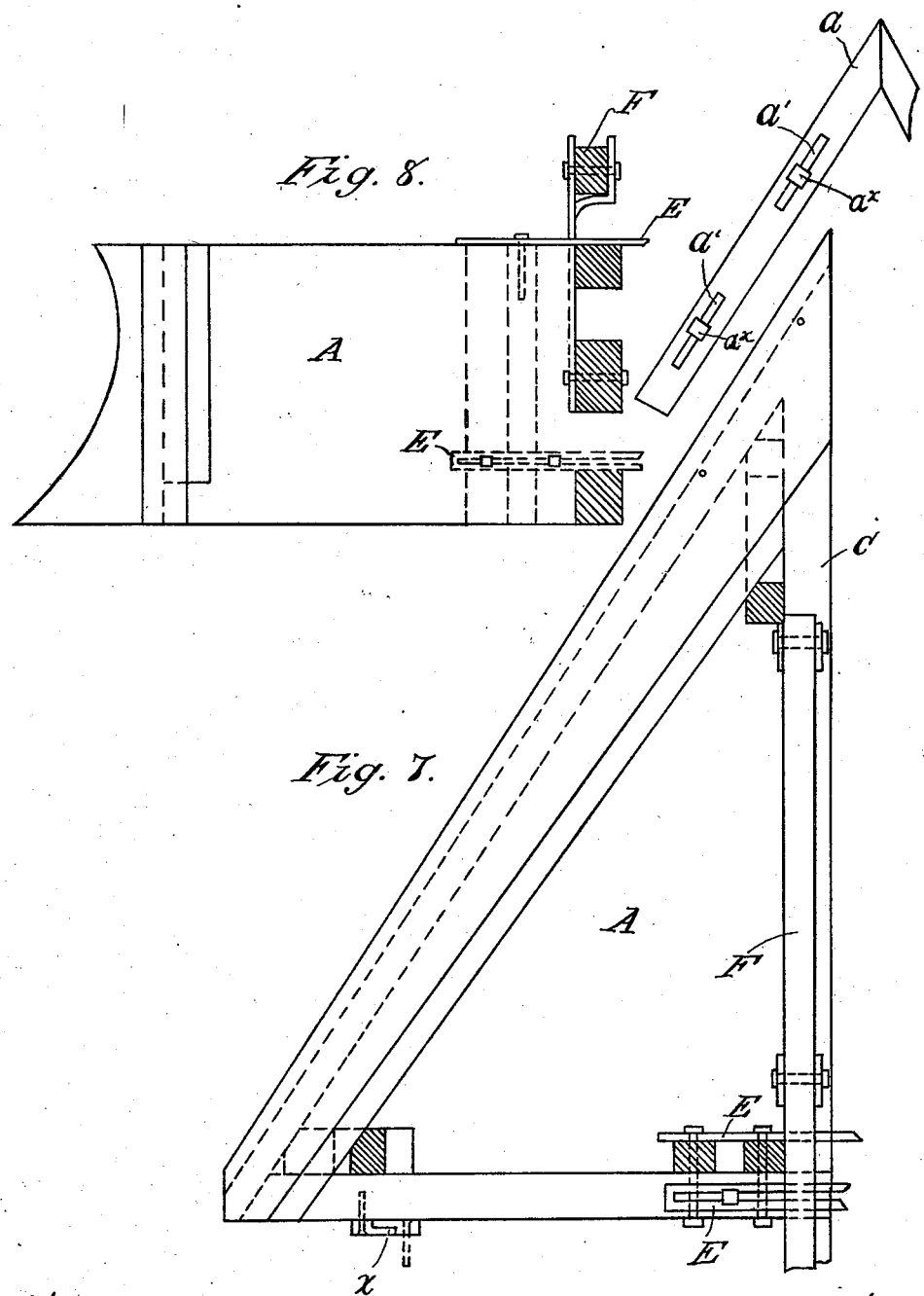

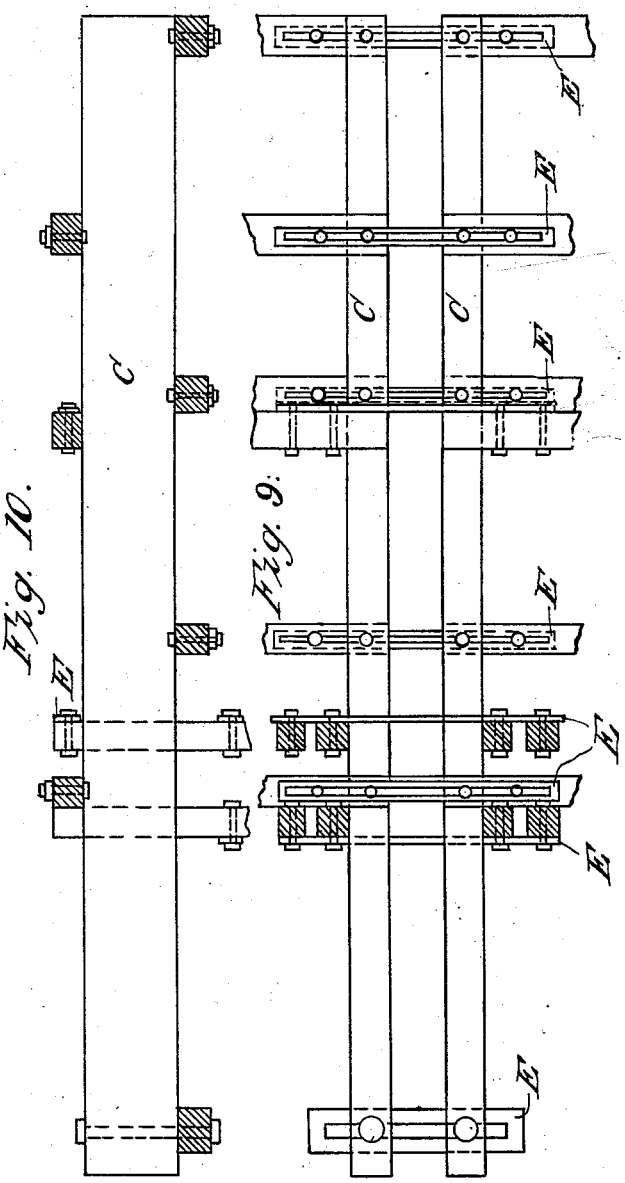

UNITED STATES PATENT OFFICE.

HARRY T. BURR, OF BANGOR, MAINE.

COMBINED SNOW-PLOW AND RUT-CUTTER.

1,005,689.     Specification of Letters Patent.     Patented Oct. 10, 1911.

Application filed May 22, 1909. Serial No. 497,656.

*To all whom it may concern:*

Be it known that I, HARRY T. BURR, citizen of the United States, residing at Bangor, in the county of Penobscot and State of Maine, have invented certain new and useful Improvements in Combined Snow-Plows and Rut-Cutters, of which the following is a specification.

Figure 4:
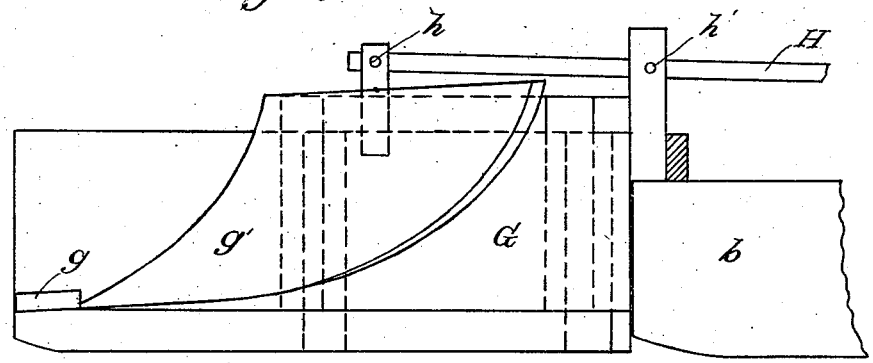
Figure 5:
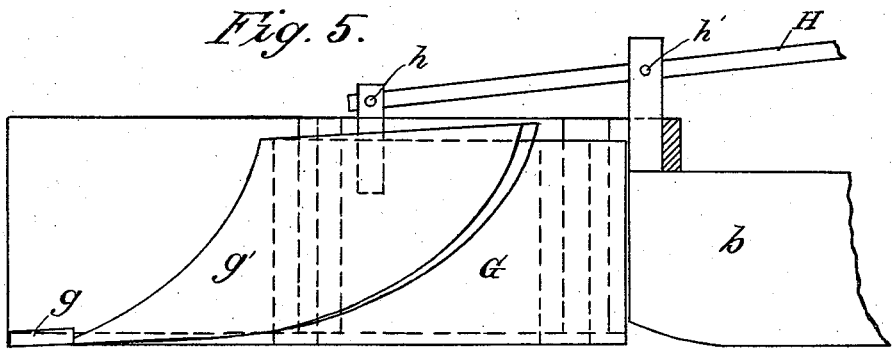
Figure 6:
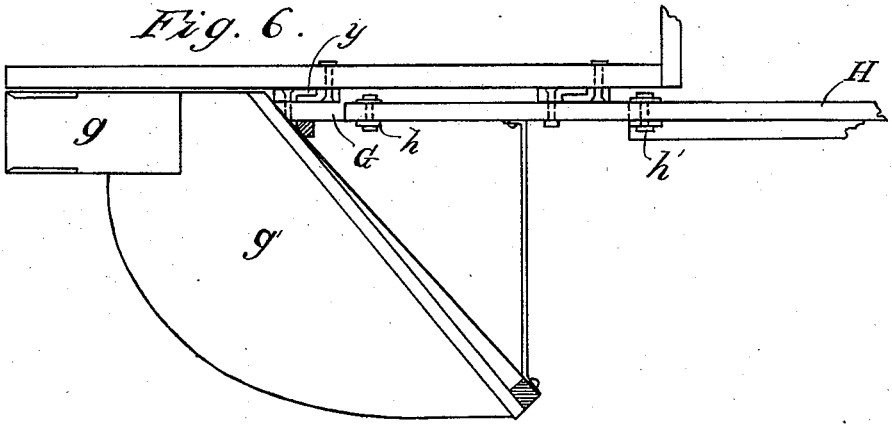

My invention consists of an improved snow-plow and rut-cutter and is fully illustrated in the accompanying drawing in which, Figure 1 is a plan. Fig. 2 is a side elevation. Fig. 3 is an elevation of the inner side of one section. Fig. 4 is an enlarged side elevation of rut-cutter portion with the cutter raised. Fig. 5 is an enlarged side elevation of rut-cutter portion with the cutter lowered. Fig. 6 is an enlarged plan of one of the rut-cutter portions. Fig. 7 is an enlarged plan of one section of front of plow with adjustable point shown detached. Fig. 8 is a rear elevation of same. Fig. 9 is a plan of twin main beams and device for regulating the width of the plow and locking the two sections when adjusted in position. Fig. 10 is a side elevation of one of main beams taken from between the beams.

Similar letters refer to corresponding parts throughout the figures.

I am aware of the fact that there are snow-plows equipped with rut-cutters and particularly of the Patent 729,265 and I do not claim anything therein shown.

The novelty of my invention lies principally in four principal features viz: 1. In its capacity for lateral expansion and contraction, thus adapting it for use in roads and tracks of different widths. 2. In the adjustable plow nose. 3. In the style and operation of the rut-cutters and 4 in the mechanism for raising and lowering the plow portion and the rut-cutters.

When assembled my device consists of three principal parts the rear or body portion B traveling on runners $b$, the plow portion A and the pilot bob-sled D. But each of the portions A and B consists of two separate and distinct symmetrical right and left sections as shown in Fig. 1.

Upon the inner sides of the portions B and forming part of the frame thereof, are the rigid, parallel, central, longitudinal main beams C and these project forward, and through the frame of the plow-portion A, to a point of junction with the pilot bob-sled D.

The right and left sections of portions A and B are rigidly secured together in the position shown in Fig. 1 by any suitable locking device capable of lateral adjustment, thus permitting the width of the device to be increased or diminished as may be required. I have shown in the drawings longitudinally slotted metal straps E secured by nuts to screw-bolts projecting from the cross frame-pieces, but as before stated any suitable locking device permitting lateral adjustment may be used. The two sections of the plow portion A, being united by the straps as described, are supported by the main beams C and are connected with the rear portion B by vertical interlocking flanges at $x$ whereby vertical adjustment of the plow section with reference to the rear section is permitted and this adjustment is obtained by means of hand-levers F fulcrumed at $f'$ on the main beams or cross-pieces of the portion B. There are preferably four of these levers—two for lifting the nose and two for the base of the plow—with devices at $f^2$ for locking the levers in position.

To enable the plow to be operated when the right and left sections are spread apart I have provided the peaked adjustable nose $a$ symmetrical with and shaped to fit over the flaring sides of the plow A and close the space between the sides and to be bolted, clamped, or otherwise secured to said sides at any convenient points as the same are spread or brought together. As shown it is longitudinally slotted at $a'$ and secured by nuts to screw-bolts $a^x$ projecting from the flaring sides, but any suitable locking device may be used.

I attach a frame G, carrying a rut-cutter $g$ and fitted with a mold-board $g'$ to each of the outer sides of the body portion B by means of vertical interlocking flanges $y$, whereby the cutters are adapted to be lowered below the bottom of the body part B and raised to its level when not in use, and these cutters with the mold-boards and frames are raised and lowered by means of the levers H attached to the frames at $h$ as shown in Figs. 2 and 3 and fulcrumed upon some convenient portions of the body B as at $h'$. The rut-cutter $g$ consists of a cutting gouge or chisel with side wings of the width of the rut which it is desired to cut and is preferably made detachable and arranged to be bolted or otherwise detachably secured to the mold-board, so that when dulled it may be removed and sharpened, or replaced by another of a different width to produce a wider or narrower rut. The cutters may be formed of various shapes so that when bolted to the mold-boards any desired forward and downward slant or depth of cut may be had. I further provide the wings I pivoted to the frame G at $i$ and so rising and falling with it and adapted to be spread out and folded back laterally and secured in position by arms $m$ hinged to the wings I and locking at convenient points in their lengths to convenient points of attachment on the body frame, while their rear ends may be lifted independently of any motion of the cutters and held in place as shown in Fig. 2 by chains K secured to standards $k$ projecting upward from the body frame.

The body portion is floored over to permit the operator to stand thereon and operate the various levers.

In operation the animals are harnessed to the pilot sled and, when used as a plow only in soft snow, the cutters are raised by means of the levers H and do not operate. If a wide track is desired the wings I are extended and locked in position. If an obstruction in front is encountered the plow portion A is raised by means of the levers F and lowered when the obstruction is passed. If one appears at the side, a wing I is folded in or raised as the nature of the case requires. Upon a hard road already plowed the plow portion A may be raised or not as desired and the cutters depressed. Upon a hard bottom and a covering of soft snow both plow and cutter may be used. When the cutters are to be used to form ruts, the widths of the plow and body portions are adjusted and the parts are locked in position so that the distance between the ruts cut may conform to that between the runners of the sleds which are to use the road.

Having thus described my invention what I claim and desire to secure by Letters Patent is:

1. In a combined snow-plow and rut-cutter, a plow portion consisting of two substantially symmetrical right and left parts tapering from rear to front adjustable laterally and equipped with devices for rigidly locking the two parts together when adjusted, in combination with an adjustable nose symmetrical with and shaped to fit over the flaring sides of the plow portion and be secured thereto at any desired points and close the space between said sides in front thereof.

2. A combined snow-plow and rut-cutter consisting of the combination of a pilot-sled, a plow-portion and a body portion, having the plow-portion and the body portion each constructed in two substantially symmetrical right and left sections adjustable laterally and equipped with devices for rigidly locking the sections together when adjusted and having a nose adjustable upon the forward end of the plow portion.

HARRY T. BURR.

Witnesses:
HARRIET C. RAIMEY,
RUBY I. NASON.

---

Copies of this patent may be obtained for five cents each, by addressing the "Commissioner of Patents, Washington, D. C."